US012283215B2

(12) United States Patent
Wang et al.

(10) Patent No.: US 12,283,215 B2
(45) Date of Patent: Apr. 22, 2025

(54) DISPLAY DEVICE AND DRIVING METHOD THEREOF

(71) Applicant: E Ink Holdings Inc., Hsinchu (TW)

(72) Inventors: Wen-Chuan Wang, Hsinchu (TW); Ian French, Hsinchu (TW); Kuang-Heng Liang, Hsinchu (TW); Chih-Ching Wang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 18/444,765

(22) Filed: Feb. 19, 2024

(65) Prior Publication Data

US 2024/0321162 A1 Sep. 26, 2024

Related U.S. Application Data

(60) Provisional application No. 63/453,165, filed on Mar. 20, 2023.

(51) Int. Cl.
*G09G 3/20* (2006.01)

(52) U.S. Cl.
CPC ....... *G09G 3/20* (2013.01); *G09G 2310/0289* (2013.01); *G09G 2310/08* (2013.01)

(58) Field of Classification Search
CPC ............. G09G 3/20; G09G 2310/0289; G09G 2310/08
See application file for complete search history.

(56) References Cited

U.S. PATENT DOCUMENTS 10,049,619 B2 8/2018 Choi et al.
10,269,321 B2 4/2019 Yoon et al.
10,311,816 B2 6/2019 Kim
10,488,964 B2 11/2019 Lee et al.
10,593,282 B2 3/2020 Kim
10,733,950 B2 8/2020 Hwang et al.
2015/0364076 A1 12/2015 Park et al.
2018/0107315 A1* 4/2018 Lee ....................... G06F 3/0412
2022/0148507 A1 5/2022 Pyun et al.

FOREIGN PATENT DOCUMENTS

CN 107945752 4/2018
TW 201941182 10/2019

OTHER PUBLICATIONS

"Office Action of Taiwan Counterpart Application", issued on Dec. 13, 2024, p. 1-p. 6.

* cited by examiner

*Primary Examiner* — Jonathan A Boyd
(74) *Attorney, Agent, or Firm* — JCIPRNET

(57) ABSTRACT

A display device including a display panel and a driving circuit is provided. The display panel is configured to display an image frame. The driving circuit is coupled to the display panel. The driving circuit is configured to output a gate signal to drive the display panel to display the image frame during a driving period. The driving period includes a first period, a second period, and a third period. The gate signal has a first voltage level during the first period and a second voltage level during the second period. The second voltage level is greater than the first voltage level.

9 Claims, 5 Drawing Sheets

DISPLAY DEVICE AND DRIVING METHOD THEREOF

CROSS-REFERENCE TO RELATED APPLICATION

This application claims the priority benefit of U.S. provisional application Ser. No. 63/453,165, filed on Mar. 20, 2023. The entirety of the above-mentioned patent application is hereby incorporated by reference herein and made a part of this specification.

BACKGROUND OF THE INVENTION

Field of the Invention

The invention relates to an electronic device and a driving method thereof, and in particular to a display device and a driving method thereof.

Description of Related Art

The display principle of electronic paper display is to drive an ink particle coated in a pixel capacitor using a thin-film transistor backplane signal. In order to meet the demand for increased driving voltage, the gate voltage of the traditional two-stage drive also needs to be adjusted accordingly. At this time, when the thin-film transistor is turned on, the voltage difference of the gate and the source is also increased significantly, for example, increased to 63 volts (V). Therefore, after a long period of high temperature and high voltage operation, the threshold voltage shift of the transistor is greater. This means that element characteristics are deteriorated and it leads to a decrease in the display quality of the display panel.

SUMMARY OF THE INVENTION

The invention provides a display device and a driving method thereof that may improve the display quality of a display panel.

A display device of an embodiment of the invention includes a display panel and a driving circuit. The display panel is configured to display an image frame. The driving circuit is coupled to the display panel. The driving circuit is configured to output a gate signal to drive the display panel to display the image frame during a driving period. The driving period includes a first period, a second period, and a third period. The gate signal has a first voltage level during the first period and a second voltage level during the second period. The second voltage level is greater than the first voltage level.

A driving method of a display device of an embodiment of the invention includes: outputting a gate signal having a first voltage level to drive a display panel to display an image frame during a first period of a driving period; outputting the gate signal having a second voltage level to drive the display panel to display the image frame during a second period of the driving period, wherein the second voltage level is greater than the first voltage level; and outputting the gate signal having a third voltage level to drive the display panel to display the image frame during a third period of the driving period.

In an embodiment of the invention, the driving method of the display device further includes: outputting a source signal to drive the display panel to display the image frame during the driving period. The source signal has a fourth voltage level during the first period. The fourth voltage level is less than the first voltage level.

In an embodiment of the invention, the gate signal has a third voltage level during the third period. The third voltage level is equal to the first voltage level.

In an embodiment of the invention, the first period, the second period, and the third period are sequentially adjacent consecutive periods during the driving period.

In an embodiment of the invention, time lengths of the first period, the second period, and the third period are equal.

In an embodiment of the invention, time lengths of the second period and the third period are equal. The time length of the second period is greater than a time length of the first period.

In an embodiment of the invention, the driving circuit is further configured to output a source signal to drive the display panel to display the image frame during the driving period. The source signal has a fourth voltage level during the first period. The fourth voltage level is less than the first voltage level.

In an embodiment of the invention, the source signal has a fifth voltage level during the second period. The fifth voltage level is located in a first voltage range.

In an embodiment of the invention, the fourth voltage level is located in the first voltage range.

In an embodiment of the invention, the source signal has a sixth voltage level during the third period. The sixth voltage level is located in a second voltage range. The second voltage range includes the first voltage range.

In order to make the aforementioned features and advantages of the disclosure more comprehensible, embodiments accompanied with figures are described in detail below.

DESCRIPTION OF THE EMBODIMENTS

Figure 1:
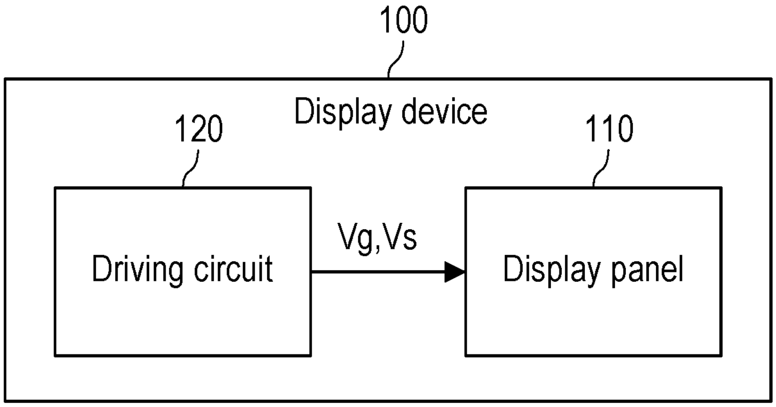
FIG. 1 shows a schematic block diagram of a display device of an embodiment of the invention.
Figure 2:
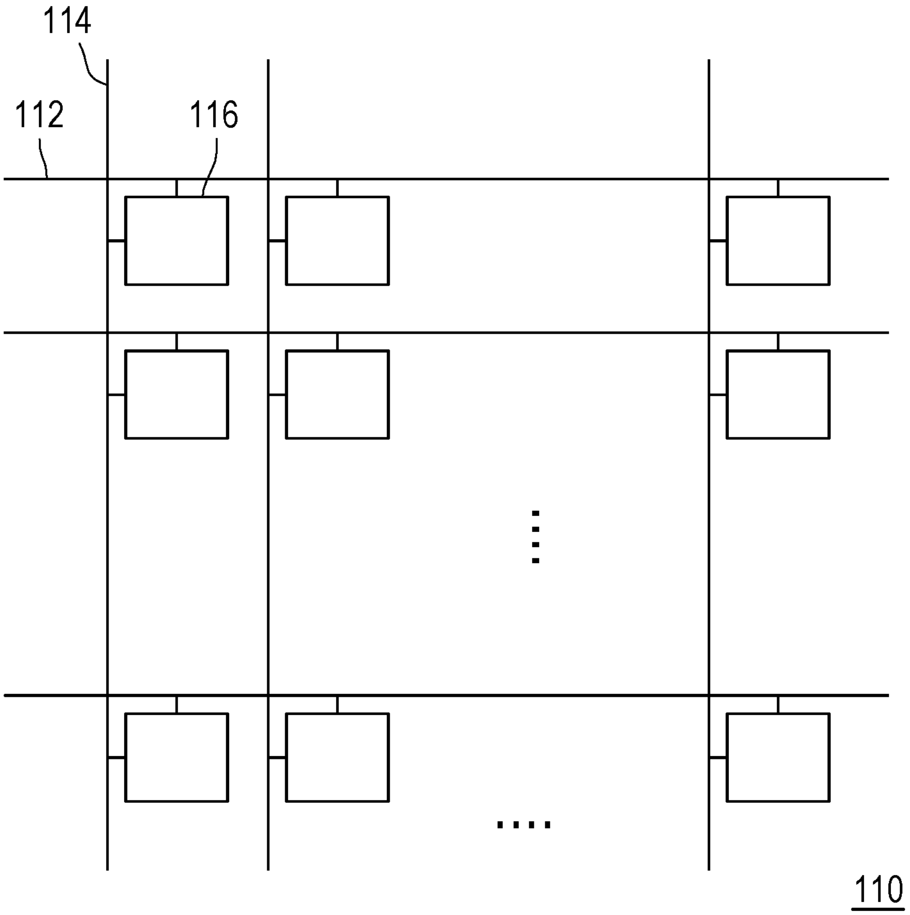
FIG. 2 shows a schematic diagram of the display panel of the embodiment of FIG. 1.
Figure 3:
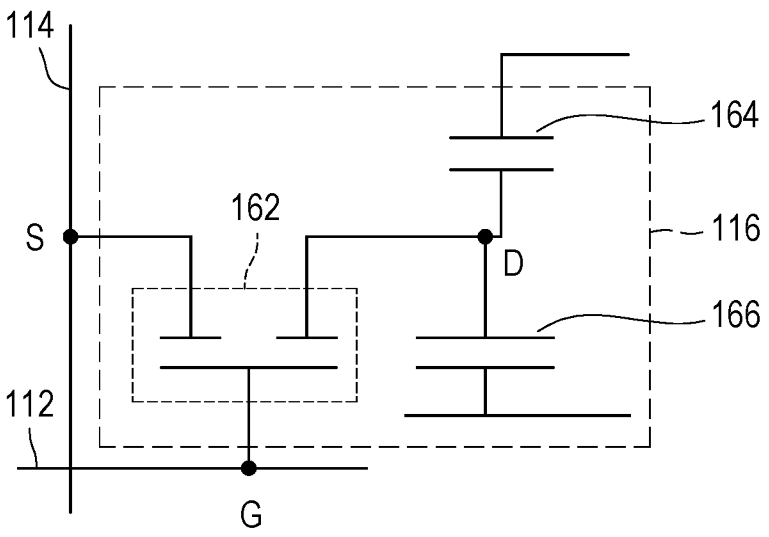
FIG. 3 shows a schematic diagram of the pixel circuit of the embodiment of FIG. 2.
Figure 4:
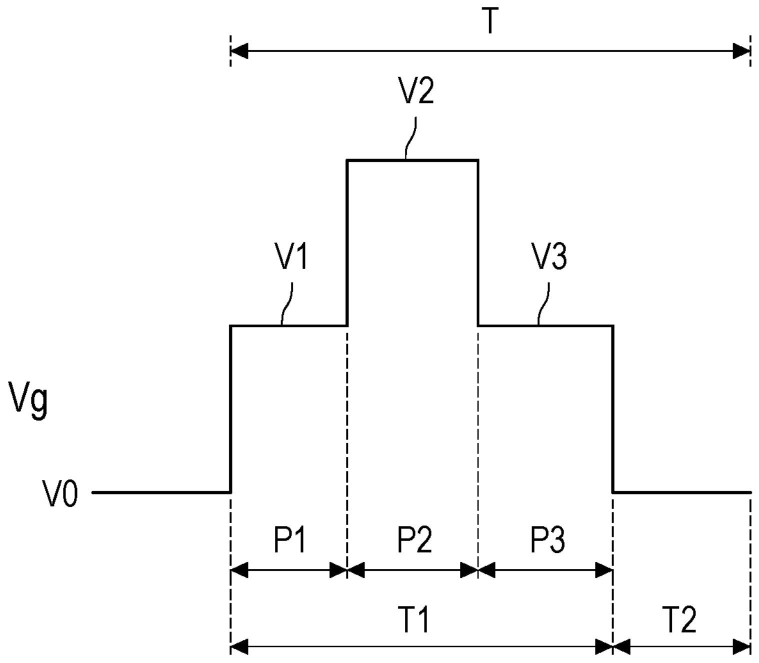
FIG. 4 shows a schematic diagram of the waveform of the gate signal of the embodiment of FIG. 1.

FIG. 1 shows a schematic block diagram of a display device of an embodiment of the invention. FIG. 2 shows a schematic diagram of the display panel of the embodiment of FIG. 1. FIG. 3 shows a schematic diagram of the pixel circuit of the embodiment of FIG. 2. FIG. 4 shows a schematic diagram of the waveform of the gate signal of the embodiment of FIG. 1.

Referring to FIGS. 1 to 4, a display device 100 includes a display panel 110 and a driving circuit 120. The driving circuit 120 is coupled to the display panel 110. The driving circuit 120 is configured to output a gate signal Vg to drive the display panel 110 to display an image frame during a driving period T. The driving circuit 120 may include a scan driver and a data driver (not shown) to respectively output the gate signal Vg and a source signal Vs to drive the display panel 110.

The display panel 110 includes a plurality of scan lines 112, a plurality of data lines 114, and a plurality of pixel circuits 116. FIG. 3 shows the equivalent circuit structure of one of the pixel circuits 116. The pixel circuit 116 includes a transistor 162, a pixel capacitor 164, and a storage capacitor 166. The transistor 162 is, for example, an amorphous silicon (a-Si) thin-film transistor.

The transistor 162 includes a first terminal S, a second terminal D, and a control terminal G. The first terminal S of the transistor 162 is coupled to the data lines 114, the second terminal D of the transistor 162 is coupled to the pixel capacitor 164 and the storage capacitor 166, and the control terminal G of the transistor 162 is coupled to the scan lines 112. The first terminal and the second terminal of the pixel capacitor 164. The first terminal of the pixel capacitor 164 is coupled to a common voltage, and the second terminal of the pixel capacitor 164 is coupled to the second terminal D of the transistor 162. The first terminal of the storage capacitor 166 is coupled to the second terminal D of the transistor 162, and the second terminal of the storage capacitor 166 is coupled to the common voltage.

In FIG. 4, the driving period T includes a first period P1, a second period P2, and a third period P3. The first period P1, the second period P2, and the third period P3 are sequentially adjacent consecutive periods during the driving period T1. The time lengths of the first period P1, the second period P2, and the third period P3 are equal. In other embodiments, the time lengths of the first period P1, the second period P2, and the third period P3 may also be not equal. For example, in an embodiment, the time lengths of the second period P2 and the third period P3 may be set to be equal, and the time length of the second period P2 may be set to be greater than the time length of the first period P1. By setting the time lengths of the second period P2 and the third period P3 to be longer, the contrast of the image frame may be improved. In addition, during the period in T1, the transistor 162 is turned on, and during the period T2, the transistor 162 is not turned on.

The gate signal Vg has a first voltage level V1 during the first period P1, a second voltage level V2 during the second period P2, and a third voltage level V3 during the third period P3. In the present embodiment, the second voltage level V2 is greater than the first voltage level V1, and the third voltage level V3 is equal to the first voltage level V1. For example, the first voltage level V1, the second voltage level V2, and the third voltage level V3 may be set to 18 V, 45 V, and 18 V respectively. In addition, an initial voltage V0 of the gate signal Vg is, for example, −30 V. However, the above voltage values are not intended to limit the invention.

In the present embodiment, the display device 100 is, for example, an electronic paper display device, but the invention is not limited thereto. In an embodiment, the display device 100 may also be a display device such as a liquid-crystal display device, a light-emitting diode (LED) display device, an organic LED (OLED) display device, a micro LED display device, a mini LED display device, or a quantum dot LED display device, and the invention does not limit the type of the display device 100.

Figure 5:
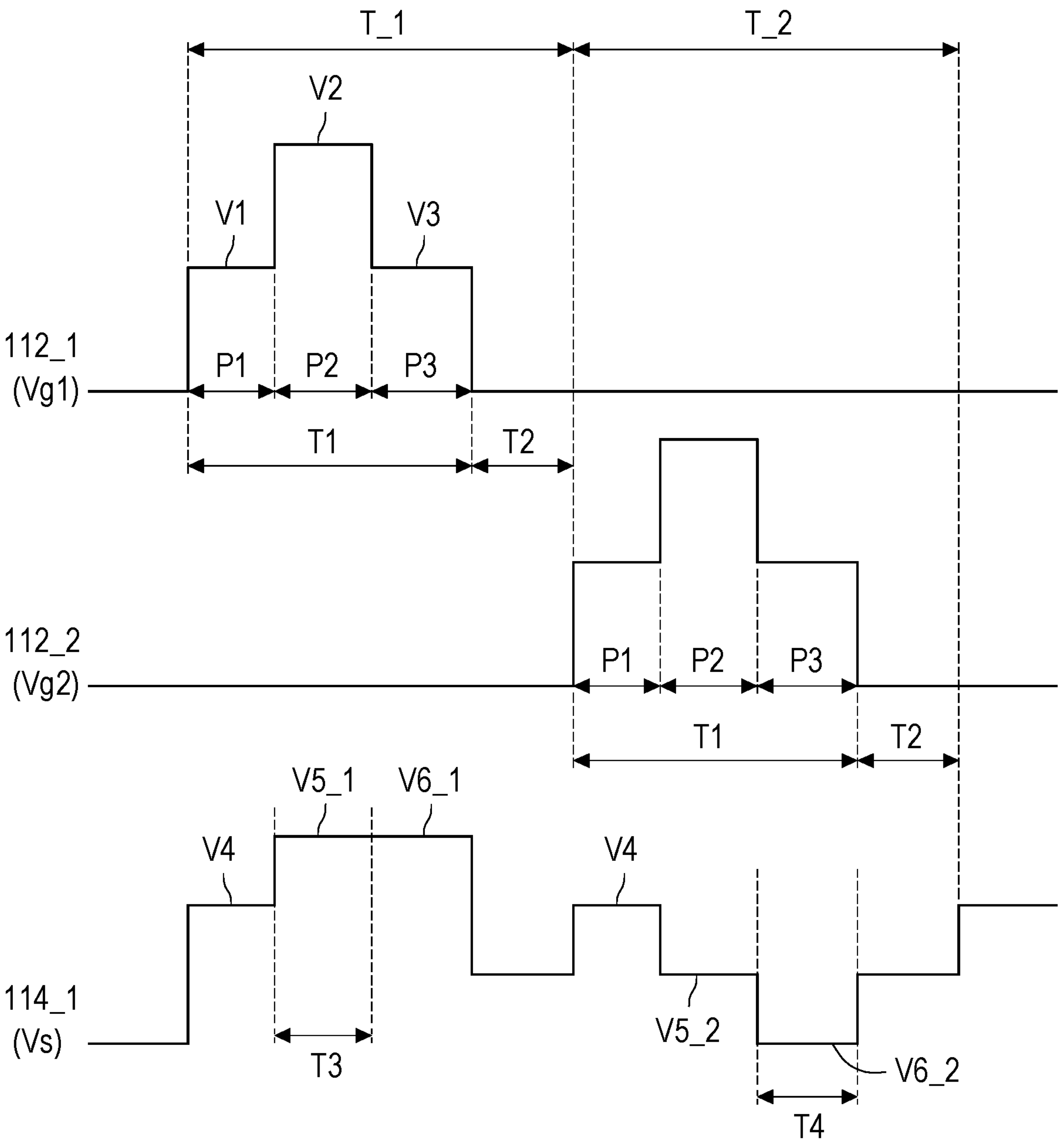
FIG. 5 shows a schematic diagram of the waveforms of gate signals and a source signal of another embodiment of the invention.

FIG. 5 shows a schematic diagram of the waveforms of gate signals and a source signal of another embodiment of the invention. Please refer to FIG. 1, FIG. 2, and FIG. 5. In the present embodiment, the driving circuit 120 outputs the gate signals Vg1 and Vg2 to scan lines 112_1 and 112_2 respectively during different driving periods T_1 and T_2, and outputs the source signal Vs to a data line 114_1. In particular, the scan lines 112_1 and 112_2 may be any two adjacent scan lines in the plurality of scan lines of FIG. 2, and the data line 114_1 may be any data line in the plurality of data lines of FIG. 2.

Specifically, the driving circuit 120 is further configured to output the source signal Vs to drive the display panel 110 to display an image frame during the driving periods T1 and T2. The source signal Vs has a fourth voltage level V4 during the first period P1, has fifth voltage levels V5_1 and V5_2 during the second period P2, and has sixth voltage levels V6_1 and V6_2 during the third period P3. In particular, the fourth voltage level V4 is less than the first voltage level V1. For example, the fourth voltage level V4 is set to 16 V during the first period P1 of both the driving periods T_1 and T_2, which is less than the first voltage level V1 set to 18 V, and the fourth voltage level V4 is located in the first voltage range of 0 V to 25 V.

Moreover, the fifth voltage level V5_1 may be set to 25 V during the second period P2 of the driving period T_1, and the fifth voltage level V5_2 may be set to 0 V during the second period P2 of the driving period T_2. That is, the fifth voltage levels V5_1 and V5_2 are located in the first voltage range of 0 V to 25 V. Moreover, the sixth voltage level V6_1 may be set to 25 V during the third period P3 of the driving period T_1, and the sixth voltage level V6_2 may be set to −25 V during the third period P3 of the driving period T_2. That is, the sixth voltage levels V6_1 and V6_2 are located in the second voltage range of −25 V to 25 V. In particular, the second voltage range-25 V to 25 V includes the first voltage range of 0 V to 25 V.

Therefore, in the present embodiment, during the first period P1, the second period P2, and the third period P3 of the driving period T_1, the voltage levels of the data line 114_1 are 16 V, 25 V, and 25 V in sequence, indicating that the corresponding pixel circuit is written with a positive voltage. During the first period P1, the second period P2, and the third period P3 of the driving period T_2, the voltage levels of the data line 114_1 are 16 V, 0 V, and −25 V in sequence, indicating that the corresponding pixel circuit is written with a negative voltage. However, the above voltage values are not intended to limit the invention.

Therefore, in the present embodiment, the driving period is divided into three periods P1, P2, and P3. The length of each of the periods may be set to 4 microseconds. The source signal Vs is set between-25 V and 25 V, and the gate signal sets the voltage in three stages: 18 V, 45 V, and 18 V. In this way, in each stage of the periods P1, P2, and P3, the voltage difference Vgs between the gate and the source of the transistor 162 may be no more than 45 V. That is, after a long period of high temperature and high voltage operation, the threshold voltage shift effect of the transistor 162 may still be reduced to ensure the display quality of the panel.

Figure 6:
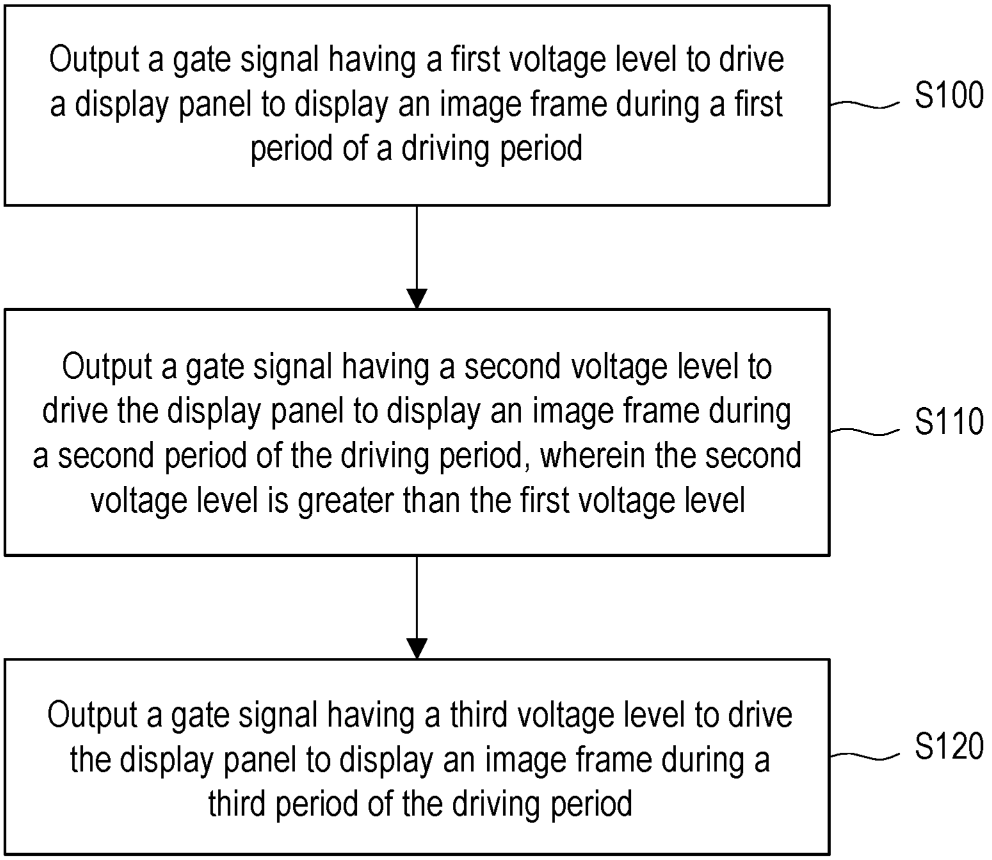
FIG. 6 shows a flowchart of steps of a driving method of a display device of an embodiment of the invention.

FIG. 6 shows a flowchart of steps of a driving method of a display device of an embodiment of the invention. Please refer to FIG. 1, FIG. 4, and FIG. 6. The driving method of the display device of the present embodiment is at least applicable to the display device 100 of FIG. 1, but the invention is not limited thereto. Taking the display device 100 of FIG. 1 as an example, in step S100, during the first period P1 of the driving period T, the driving circuit 120 outputs the gate signal Vg having the first voltage level V1 to drive the display panel 110 to display an image frame. In step S110, during the second period P2 of the driving period T, the driving circuit 120 outputs the gate signal Vg having the second voltage level V2 to drive the display panel 110 to display an image frame, wherein the second voltage level V2 is greater than the first voltage level V1. In step S120, during the third period P3 of the driving period T, the driving circuit

120 outputs the gate signal Vg having the third voltage level V3 to drive the display panel 110 to display an image frame.

In addition, sufficient teachings, suggestions, and implementation instructions of the driving method of the display device of an embodiment of the invention may be obtained from the description of the embodiments of FIG. 1 to FIG. 5.

Based on the above, in an embodiment of the invention, the driving period is divided into three periods, the time length of each of the periods may be set to be equal, the source signal is set to be between a preset voltage range, and the gate signal is set in three stages. In this way, during the driving period, the voltage difference between the gate and the source of the transistor may be kept within a predetermined value, thereby reducing the threshold voltage shift effect of the transistor and ensuring the display quality of the panel.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A display device, comprising:

a display panel configured to display an image frame; and a driving circuit coupled to the display panel and configured to output a gate signal to drive the display panel to display the image frame during a driving period, wherein the driving period comprises a first period, a second period, and a third period, the gate signal has a first voltage level during the first period and a second voltage level during the second period, and the second voltage level is greater than the first voltage level, wherein during the driving period, the driving circuit is further configured to output a source signal to drive the display panel to display the image frame, wherein the source signal has a voltage level during the third period, the voltage level is within a second voltage range, and the second voltage range comprises the first voltage range, wherein a lower limit value of the second voltage range is smaller than a lower limit value of the first voltage range, and an upper limit value of the second voltage range is greater than or equal to an upper limit value of the first voltage range.

2. The display device of claim 1, wherein the gate signal has a third voltage level during the third period, and the third voltage level is equal to the first voltage level.

3. The display device of claim 1, wherein the first period, the second period, and the third period are sequentially adjacent consecutive periods during the driving period.

4. The display device of claim 1, wherein time lengths of the first period, the second period, and the third period are equal.

5. The display device of claim 1, wherein time lengths of the second period and the third period are equal, and the time length of the second period is greater than a time length of the first period.

6. The display device of claim 1, wherein the source signal has a fourth voltage level during the first period, and the fourth voltage level is less than the first voltage level.

7. The display device of claim 6, wherein the source signal has a fifth voltage level during the second period, and the fifth voltage level is within a first voltage range.

8. The display device of claim 7, wherein the fourth voltage level is within the first voltage range.

9. A driving method of a display device, the driving method comprising:

outputting a gate signal having a first voltage level to drive a display panel to display an image frame during a first period of a driving period;

outputting the gate signal having a second voltage level to drive the display panel to display the image frame during a second period of the driving period, wherein the second voltage level is greater than the first voltage level;

outputting the gate signal having a third voltage level to drive the display panel to display the image frame during a third period of the driving period; and outputting a source signal to drive the display panel to display the image frame, wherein the source signal has a voltage level during the third period, the voltage level is within a second voltage range, and the second voltage range comprises the first voltage range, wherein a lower limit value of the second voltage range is smaller than a lower limit value of the first voltage range, and an upper limit value of the second voltage range is greater than or equal to an upper limit value of the first voltage range.

* * * * *